Patented Dec. 21, 1937

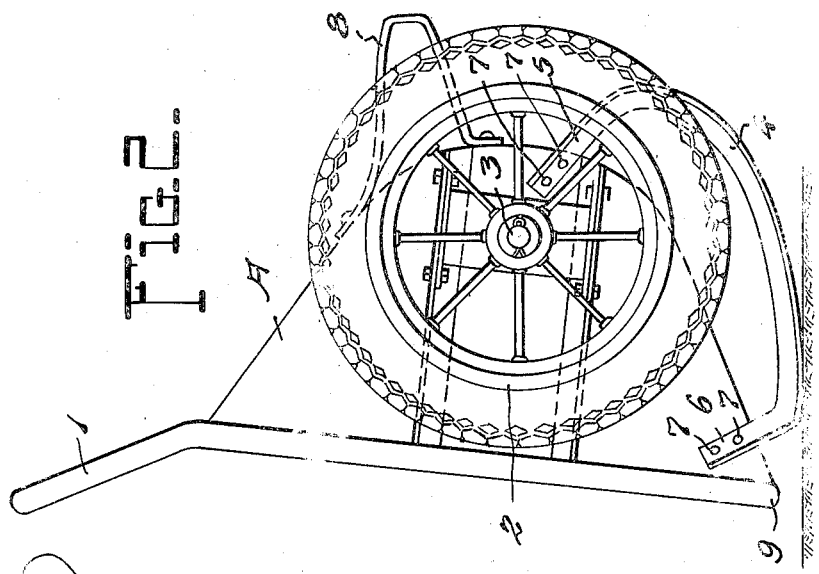
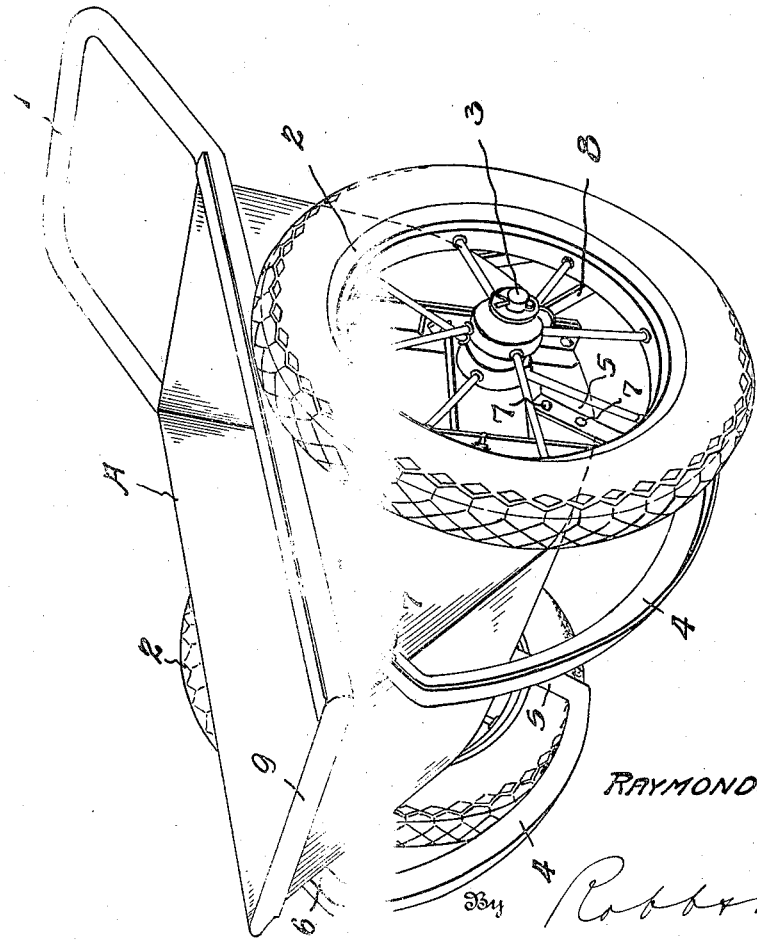

2,102,684

UNITED STATES PATENT OFFICE 2,102,684

ROCKER DUMP HAND CART

Raymond B. Dorward, Indianapolis, Ind., assignor to Insley Manufacturing Corporation, Indianapolis, Ind., a corporation Application March 30, 1936, Serial No. 71,759

2 Claims. (Cl. 280—51)

This invention has to do with hand dumping carts, so called, such as are commonly used today on building operations for the manual transporting of plastic or mixed concrete aggregates from the place of mixing to a suitable place of deposit or use, the latter often comprising the space between the forms of the building which is being erected. These carts generally comprise a wheeled manually pushed cart body of somewhat arcuate shape viewed from the side, a suitable handle being mounted at one end of the cart to facilitate the pushing thereof, and the opposite end affording a dumping portion out of which the contents of the cart pass when being emptied.

It has been customary heretofore to use relatively large metal wheels to support the cart body, the axle for the wheels being close to the center of gravity of the loaded cart, making it easy to push the same and elevate the body sufficiently high to enable it to be readily dumped because the diameter of the larger wheels was sufficient to enable a free rotation of the cart body on the axis of the wheel axle so that the dumping end of the body would be free of the ground or forms even when the body was in its extreme tilted dumping position.

The present invention comes about through the desirability of the demand for a push cart of the type described carried by pneumatic tired wheels, and since these wheels are commercially available only in relatively small diameters, approximately two-thirds the diameter of the formerly used metal wheels, the mounting of the cart upon the smaller tired wheels requires a disposition of the axle considerably below the center of gravity of the load making it impossible, in the absence of some change in the construction of the body or addition thereto, to get a clean dump of the cart unless the nose or dumping lip at the end of the cart can project down into a form or free space. Where the cart is to be dumped upon the grade upon which the cart travels, the nose or dumping lip at the end of the cart, without the improvement of the invention as hereinafter set forth, will strike the floor or surface referred to before the cart is fully tipped sufficiently to make a clean dump.

With the foregoing in view, the cart of the present invention has been designed to afford the advantages of the ease of travel or mobility in the use of the smaller pneumatic tired wheels. Additionally, I have combined with the cart body certain rocker members extending from the lower portion of the body of the cart forwardly and upwardly in advance of the dumping end thereof. These rockers or rocker members are curved upon arcs enabling the load of the cart and the batch of materials therein to be readily transferred from the two supporting wheels onto the two rockers, upon a tilting forwardly of the cart for dumping. The rockers being spaced from the forward dumping end of the cart will therefore tend to raise the body of the cart and said dumping end relatively to the surface on which the runners are engaged and the surface on which the wheels travel so that the nose or dumping lip at the dumping end of the cart will be spaced from the floor or grade on which the contents of the receptacle are to be dumped, when the cart has been tilted manually to its fully dumped position.

By the provision of the rocker members of the invention another advantage is achieved in the practical use of the dumping cart. Heretofore it has been found that in the dumping operation, when the larger wheels especially are employed, as the dumping of the cart is performed there is a tendency for the cart to move or roll backwards upon the wheels, and this tendency is usually counteracted by the cart pusher holding one of the wheels from movement in the act of tipping the cart over as it is discharged. By reason of the provision of the rockers of the invention, however, the above control of the wheels is not necessary for the simple reason that in the dumping action of the cart the entire load of the cart and its contents is shifted from the small wheels now used, to the rockers, and there is no tendency for reverse movement of the cart as it is shifted from its traveling to its dumping position.

In the accompanying drawing a preferred embodiment of the invention is illustrated, though I do not wish to be limited to the exact structure therein depicted.

The illustrations of the drawing comprise:

Figure 1 which is a perspective view of a hand or push cart of the construction of the invention.

Figure 2 which is a side elevation illustrating the cart as when it has been tilted to its substantially full dumping position, wherein it is supported on the rockers previously referred to.

Describing the invention specifically, A denotes the cart or body of the vehicle to which my invention is applied. This cart A may be of any conventional type such as quite commonly in use today, and is equipped at one end with the offstanding somewhat upwardly extended handle 1 that is grasped by the cart pusher as he handles the vehicle in transporting concrete or any other materials from one place to another. The cart body A is supported by the wheels 2 mounted upon suitable axles 3.

The wheels 2 are rubber tired and are relatively small in diameter, those preferred for the particular construction illustrated being of about 27" diameter as compared with the previously used metal wheels of something like 42" diameter.

The rocker members, which have been described as to their function, are designated 4 and consist of attachment arms 5 and 6 with the intermediate rocker or supporting members connecting said arms and constituting a continuation thereof. I preferably employ angle bars bent into suitable shape to provide each rocker member 4 with its arms 5 and 6 as a unit therewith. The arms 5 and 6 will be bolted, or preferably riveted, as shown at 7, to the adjacent sides of the cart body A which carries the same.

It is notable that the rockers 4 extend forwardly from the attachment arms 6, downwardly in spaced relation to the front and bottom portions of the cart body, and on this account the peculiar action of the cart in dumping, as heretofore outlined, is obtained. Suitable legs or rest members 8 are attached to the rear lowermost portion of the cart body A near opposite sides and support the cart body, together with the wheels 2 when the cart is being loaded.

The operation of the invention, as well as its construction, is very simple and is evident upon reference to the two figures of the drawing.

Figure 1 shows the dumping cart in its traveling position as when being pushed by the cart pusher or workman.

Figure 2 illustrates how the cart body has been tilted into its substantially vertical dumping position with the dumping nose or lip 9 down as when discharging the contents of the body A. Initially the rear portions of the rockers 4 take the load from the wheels 2 and then the load is transferred to the front ends of the rockers at the time the discharging is being completed. The rockers being stationary members and being curved on a gradual arc render the dumping operation relatively easy and do away with any necessity for holding the wheels 2 during the performance of said dumping action.

Having thus described my invention, what I claim as new and desire to secure by Letters Patent of the United States, is—

1. A hand push cart for transporting concrete and similar materials, comprising a cart body of generally arc-shaped form viewed from the side, handle means at the rear end of the body, the front end of the body forming a dumping nose or lip, axle means on the body near the lower or bottom portion thereof and at opposite sides, supporting wheels carried by the axle means, and rockers attached to the front and lower portions of the body, comprising angle bars having attachment arms secured to the upper front end portion of the body adjacent to the dumping nose and projecting forwardly therefrom and bent downwardly in advance of the plane of the front end portion of the body and to points below the bottom portion of the body, and thence bent upwardly to provide attaching arms at opposite sides of the bottom portion of the body, and means for securing the attaching arms to the body at the front end and adjacent to the bottom portions of the body.

2. A hand push cart for transporting concrete and similar materials, comprising a cart body of generally arc-shaped form viewed from the side, handle means at the rear end of the body, the front end of the body forming a dumping nose or lip, axle means on the body near the lower or bottom portion thereof and at opposite sides, supporting wheels carried by the axle means, and rockers attached to the front and lower portions of the body, comprising bars having attachment arms secured to the upper front end portion of the body adjacent the dumping nose and projecting forwardly therefrom and bent downwardly in advance of the plane of the front end portion of the body and to points below the bottom portion of the body, and means for securing the ends of the rockers to the body at the front end and adjacent the bottom portions of the body.

RAYMOND B. DORWARD.